US008725767B1

(12) United States Patent
Wood et al.

(10) Patent No.: US 8,725,767 B1
(45) Date of Patent: May 13, 2014

(54) MULTI-DIMENSIONAL OBJECT MODEL FOR STORAGE MANAGEMENT

(75) Inventors: Douglas A. Wood, Westford, MA (US); Mark A. Parenti, Milford, NH (US); Stephen J. Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 609 days.

(21) Appl. No.: 12/798,234

(22) Filed: Mar. 31, 2010

(51) Int. Cl.
*G06F 7/00* (2006.01)

(52) U.S. Cl.
USPC .......................................... 707/781

(58) Field of Classification Search
USPC .................. 707/781, 783, 785, 784, 999.009
See application file for complete search history.

(56) References Cited

U.S. PATENT DOCUMENTS

| | | | | |
|---|---|---|---|---|
| 5,911,143 A * | 6/1999 | Deinhart et al. | | 1/1 |
| 6,023,765 A * | 2/2000 | Kuhn | | 726/4 |
| 6,202,066 B1 * | 3/2001 | Barkley et al. | | 707/785 |
| 6,950,825 B2 * | 9/2005 | Chang et al. | | 1/1 |
| 7,124,192 B2 * | 10/2006 | High et al. | | 709/229 |
| 7,185,010 B2 * | 2/2007 | Morinville | | 1/1 |
| 7,451,477 B2 * | 11/2008 | Griffin et al. | | 726/1 |
| 7,523,231 B1 | 4/2009 | Gupta et al. | | |
| 7,761,320 B2 * | 7/2010 | Fliess et al. | | 705/7.14 |
| 8,166,071 B1 * | 4/2012 | Korablev et al. | | 707/783 |
| 2002/0026592 A1 * | 2/2002 | Gavrila et al. | | 713/201 |
| 2005/0021383 A1 * | 1/2005 | Fliess et al. | | 705/8 |
| 2005/0138031 A1 * | 6/2005 | Wefers | | 707/9 |
| 2008/0072290 A1 * | 3/2008 | Metzer et al. | | 726/3 |
| 2008/0072316 A1 * | 3/2008 | Chang et al. | | 726/21 |
| 2008/0077982 A1 * | 3/2008 | Hayler et al. | | 726/12 |
| 2009/0125796 A1 * | 5/2009 | Day et al. | | 715/219 |
| 2009/0313079 A1 * | 12/2009 | Wahl | | 705/9 |
| 2010/0058197 A1 * | 3/2010 | Chee et al. | | 715/751 |

OTHER PUBLICATIONS

U.S. Appl. No. 11/906,131, filed Sep. 28, 2007, Gupta et al.
EMC Celerra NX3e, "Simplified and affordable application-centric IP storage for the IT generalist", http://www.khuset.se/kh/pdfs/EMC_Celerra_NX3e.pdf, 2009.

* cited by examiner

*Primary Examiner* — Mohammed R Uddin
(74) *Attorney, Agent, or Firm* — Muirhead and Saturnelli, LLC

(57) ABSTRACT

Described are techniques for controlling access to objects. A template is selected. The template includes information specifying a role, one or more levels of expertise, and which objects and object information are accessible to said one or more levels of expertise. A first of the levels of expertise is selected. The template and the first level of expertise are associated with a user identifier. Access to objects and object information is restricted in accordance with the template when performing processing for the user identifier.

19 Claims, 10 Drawing Sheets

MULTI-DIMENSIONAL OBJECT MODEL FOR STORAGE MANAGEMENT

BACKGROUND

1. Technical Field

This application generally relates to data storage, and more particularly to techniques used in connection with data management.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data may be stored on a data storage system in accordance with any one or more different data models. The data storage system may store data, for example, as objects and the data may be used by multiple applications and/or hosts. Individuals may need to access different portions of the data and there is a need to restrict or control an individual's access to appropriate portions of the data. It may be desirable to utilize a flexible technique to control such access and provide a sufficient granularity of control such as may be needed in complex data storage systems and/or complex data storage system environments.

SUMMARY OF THE INVENTION

In accordance with one aspect of the invention is a computer-implemented method for controlling access to objects comprising: selecting a template, said template including information specifying a role, one or more levels of expertise, and which objects and object information are accessible to said one or more levels of expertise; selecting a first of said one or more levels of expertise; associating the template and said first level of expertise with a user identifier; and restricting access to objects and object information in accordance with the template when performing processing for the user identifier. The object information may include attributes and methods for one or more objects. The template may be selected from a plurality of templates, each of said plurality of templates being associated with a different one of a plurality of roles and specifying one or more levels of expertise. Each of the one or more levels of expertise may indicate a different level of knowledge. The one or more levels of expertise may include said first level indicating a first user knowledge level and a second level indicating a second user knowledge level greater than said first level. When the user identifier is associated with said first level, a user using said user identifier may have access to a first set of objects and object information, and when said user identifier is associated with said second level, a user using said user identifier may have access to a second set of objects and object information. The second set may include the first set of objects and object information and additional object information. At least one object in one of the first set or the second set may be a composite object associated with another object which is a child object of the composite object. The composite object may be included in the first set and the second set, and the child object may be included in the first set and may not be included in the second set. The composite object may be included in the first set and the second set, and at least one attribute or method of the composite object may be included in the first set and may not be included in the second set. The composite object and the child object may be included in the first set and the second set, and at least one attribute or method of the child object may be included in the first set and may not be included in the second set. The one or more levels of expertise may include a novice level, a generalist or intermediate level, and an expert level. The role may describe a data storage administrator role for performing data storage administration. The role may be for performing data storage administration for one or more of an email application and a database application. The method may also include creating a plurality of templates including said template; selecting said template from said plurality of templates; and selecting said first level of expertise using additional information indicating a level of complexity of a data storage system and/or data storage system environment. As part of creating the template, the method may further include populating a table with a predetermined set of objects and/or object information selected in accordance with one or more of the role of the template, the one or more levels of expertise of the template, one or more applications identified as associated with the template, a level of complexity associated with one or more applications, and information regarding a level of complexity of the data storage system and/or data storage environment associated with the template. The template may include other information identifying one or more of an application, a level of complexity of a data storage system, a level of complexity of a data storage system environment, keywords used as matching criteria when selecting the template. The template may identify allowable operations that can be performed for data storage administration, a first of said objects representing an application, a second of said objects associated with the first object representing a data storage area used by said application for storing data, said second object having at least a first method thereof identifying an administrative task perform for the data storage area represented by the second object, said template indicating that the user identifier has access to the first method and is allowed to perform the administrative task for the data storage area.

In accordance with another aspect of the invention is a computer-implemented method for controlling access to data comprising: selecting a template, said template including information specifying a role, one or more levels of expertise, and which portions of the data are accessible to said one or more levels of expertise; selecting a first of said one or more levels of expertise; associating the template and said first level of expertise with a user identifier; and restricting access to objects and object information in accordance with the template when performing processing for the user identifier.

In accordance with yet another aspect of the invention is a computer readable medium comprising executable code stored thereon to control access to objects, the computer readable medium comprising executable code that: selects a template, said template including information specifying a role, one or more levels of expertise, and which objects and object information are accessible to said one or more levels of expertise; selects a first of said one or more levels of expertise; associates the template and said first level of expertise with a user identifier; and restricts access to objects and object information in accordance with the template when performing processing for the user identifier.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
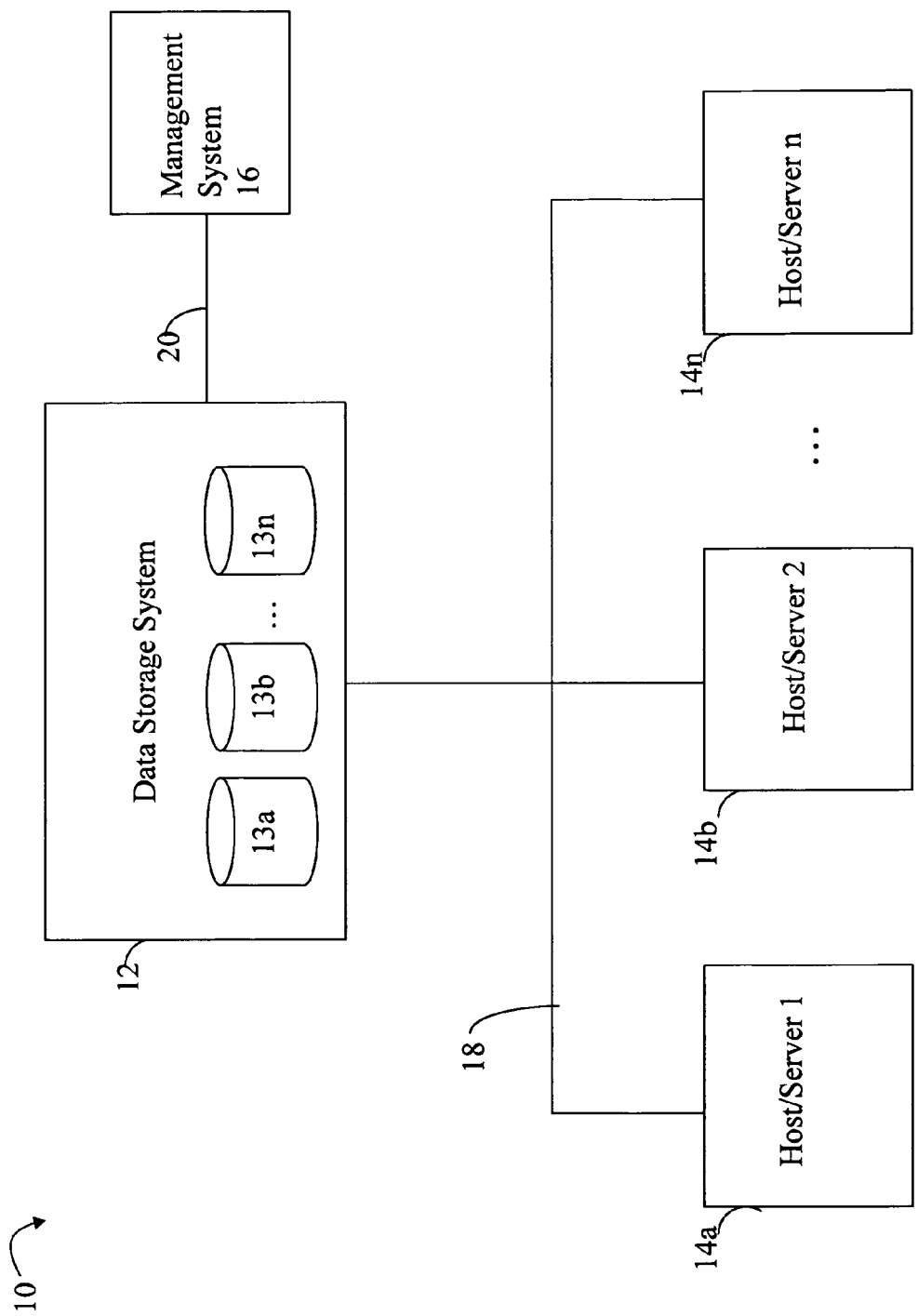
FIG. 1 is an example of an embodiment of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with performing data storage administration and other tasks such as storing the data of the hosts on the appliance, configuring the data storage for use by the hosts, backing up data from the storage system, and the like. As an example in connection with an email application server component that may executed on the hosts 14a-14n, the data storage configuration tasks may include allocating storage for user accounts or mailboxes, specifying the devices (logical and/or physical) used to store the email data, specifying whether data replication is performed for disaster recovery, and the like.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

Data may be stored on one or more data storage system in accordance with any one or more different data models. The data storage system may store data, for example, as objects and the data may be used by multiple applications and/or hosts as clients or tenants. Thus, the data storage system may provide data storage in a multi-tenant environment. Individuals may need to access different portions of the data and there is a need to restrict or control an individual's access to appropriate portions of the data. Described in following paragraphs are techniques that may be used to control access to data where such techniques also provide a sufficient granularity of control as may be needed in complex data storage systems and/or complex data storage environments. Such techniques may be used in connection with individual users performing, for example, data storage administration.

Described in following paragraphs are techniques is a data object model that may be characterized as having multiple dimensions. Although the data object model described in accordance with techniques herein has a variety of uses, in one embodiment, the data object model described in accordance with techniques herein may be used to describe accessibility to objects, attributes, and the like, used for managing a system, such as a data storage system. As an example, an embodiment of the data object model in accordance with techniques herein may define one or more objects representing an application, data storage areas used for storing application data, operations performed on the application data and storage areas in connection with storage management, and attributes that may be viewed, modified, and the like, in connection with performing data storage management tasks. A user, such as a data storage administrator, which has access to particular objects, attributes, methods, etc. is permitted to perform various operations for data storage system management as indicated by the appropriate objects, attributes, methods, and the like, to which the user has access. To further illustrate, the data model may be used to represent an email application, data stored by the email application on the data storage system, and what operations, tasks, and the like, may be performed on the data areas used for storing the application data, what attributes characterize such data areas (e.g., which particular LUNs are used for storage, the RAID level (e.g., RAID-1, RAID-6, etc.) and configuration (e.g., number of data and parity devices) for such data areas, the data protection process performed such as snapshot, backup, etc., for such data areas. In accordance with techniques herein, a user such as a data storage administrator may be allowed to access particular objects, methods, attributes, and the like, where such allowed access to a particular object, method, etc., indicates that the user can perform, for example, the associated method for the object, perform a particular operation for one of the object attributes, and so on. Thus, by permitting a user to have access to selected objects, methods, and attributes, the data object model may be used to describe the operations the user is allowed to perform for data management, the attributes the user is allowed to view, modify, or otherwise operate on to perform data management, and the like. These and other uses of the techniques herein will become apparent to those skilled in the art with the benefit of further description as set forth in following paragraphs. Although the data model may be described herein with one or more particular applications and uses, the techniques herein should not be construed as limited to these presented herein for illustration and example.

Figure 2:
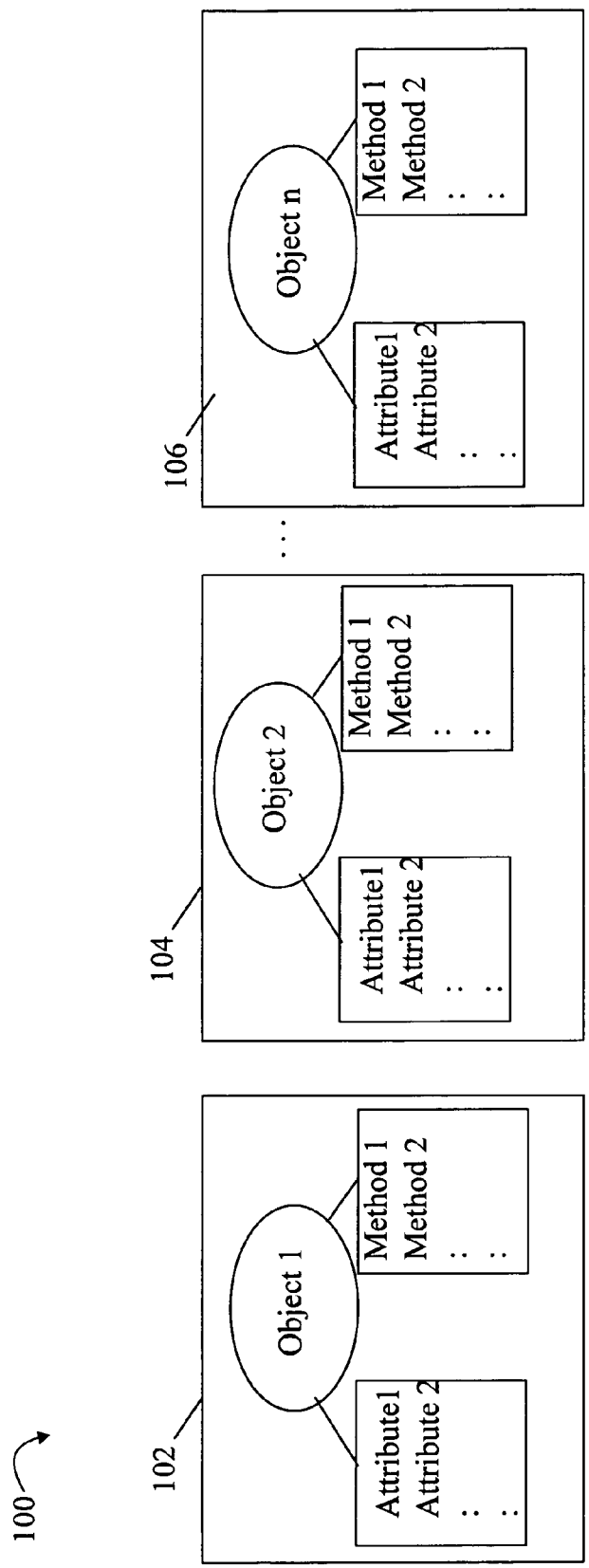
FIGS. 2-6 illustrate different dimensions that may be associated with a data model in accordance with techniques herein.

Referring to FIG. 2, shown is an example illustrating a first type of dimension of an object model. Shown in the example 100 are a plurality of objects 1-*n*, denoted 102-106. Each object may include associated attributes and methods. As known in the art, attributes describe or characterize different aspects of the object. An object's methods may be invoked to perform operations on the object such as, for example, to create an object, update data of the object, display information about the object, and the like. The objects 102-106 in the example 100 may be characterized as raw or basic objects included in a flat, enumerable namespace.

In a system having an object model based on only the first dimension of FIG. 2, any user may access any object, examine and/or operate on any attribute, and invoke any method.

Figure 3:
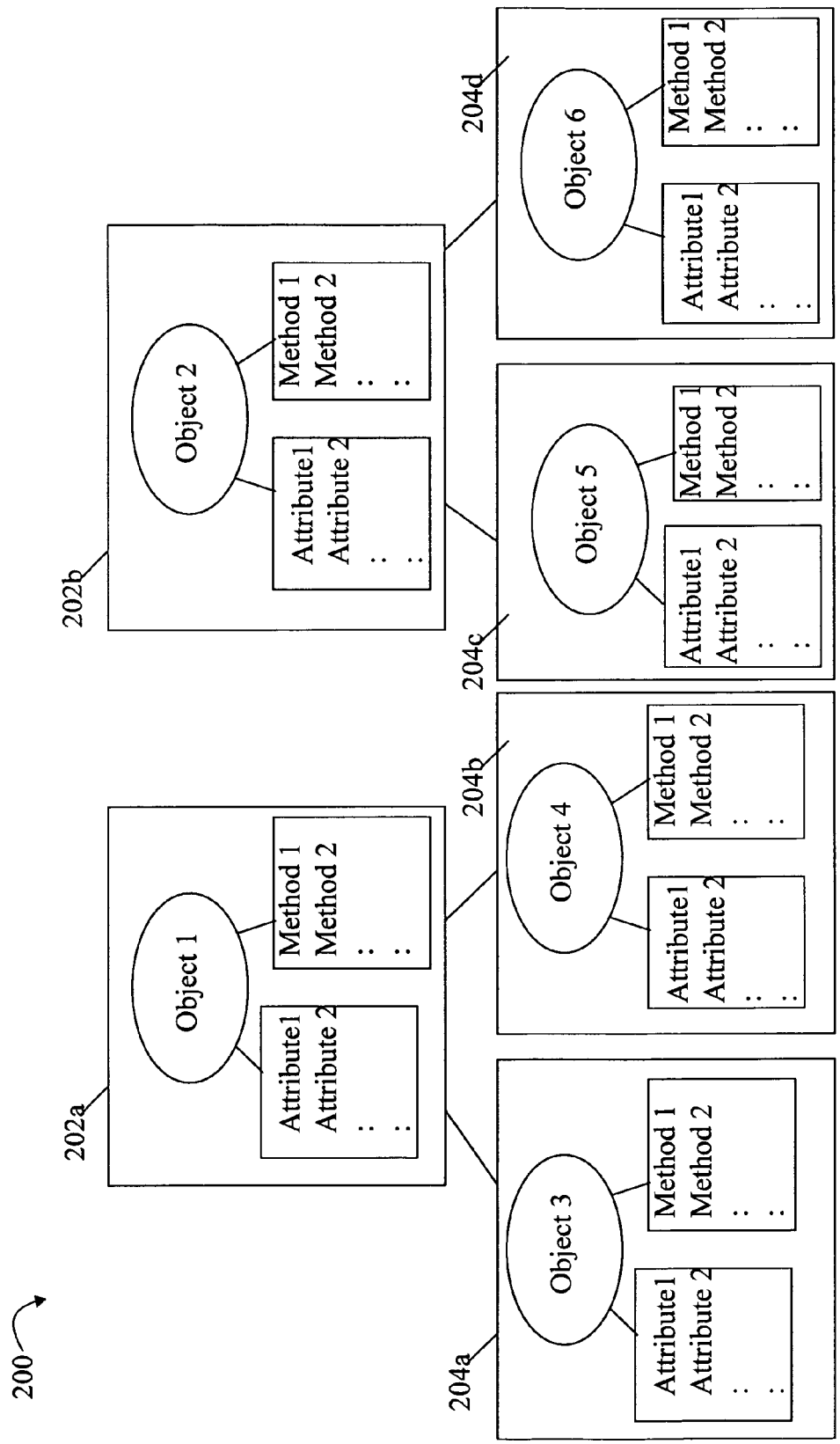

Referring to FIG. 3, shown is an example illustrating a second type of dimension of an object model which builds upon the first dimension and objects of FIG. 2. Shown in the example 200 are a plurality of objects 202a, 202b, and 204a-204d. Elements 204a-204d may represent raw or basic objects as illustrated in FIG. 2. Elements 202a and 202b may represent composite objects which form a hierarchical object model. Each of the composite objects 202a, 202b may have attributes and methods. Additionally, each composite object 202a and 202b may be associated with one or more raw or basic objects. It should be noted that a composite object may be associated with any number of raw or basic objects rather than just two as illustrated in the example 200. Furthermore, the hierarchical object model may have more than two levels as illustrated. For example, there may be three levels or more in the object model hierarchy depending on the associations between objects. As an example of a three level object model, a first composite object may be associated with a second composite object, where the second composite object may be associated with several raw or basic objects. As a variation with reference to the example 200, the foregoing may be illustrated by having yet another object 7 associated with object 3 (204a) so that 202a and 204a are composite objects and 204b and the new object 7 are raw or basic objects.

An association between two objects may represent any type of relationship between the objects. For example, a composite object may be an object representing an email application such as Microsoft Exchange. The composite object may be associated with three raw objects—2 LUN objects and a third object that is a cache or database object. The foregoing three raw objects may also be characterized as child objects of the composite object. The raw objects may represent data storage areas used by the email application, where the email application is represented by the composite object.

In a system having an object model based on only the dimensions of FIG. 3, any user may access any composite object and its associated raw objects. Any user may also examine and/or operate on any attribute and invoke any method of any such composite object and its associated raw objects.

Figure 4:
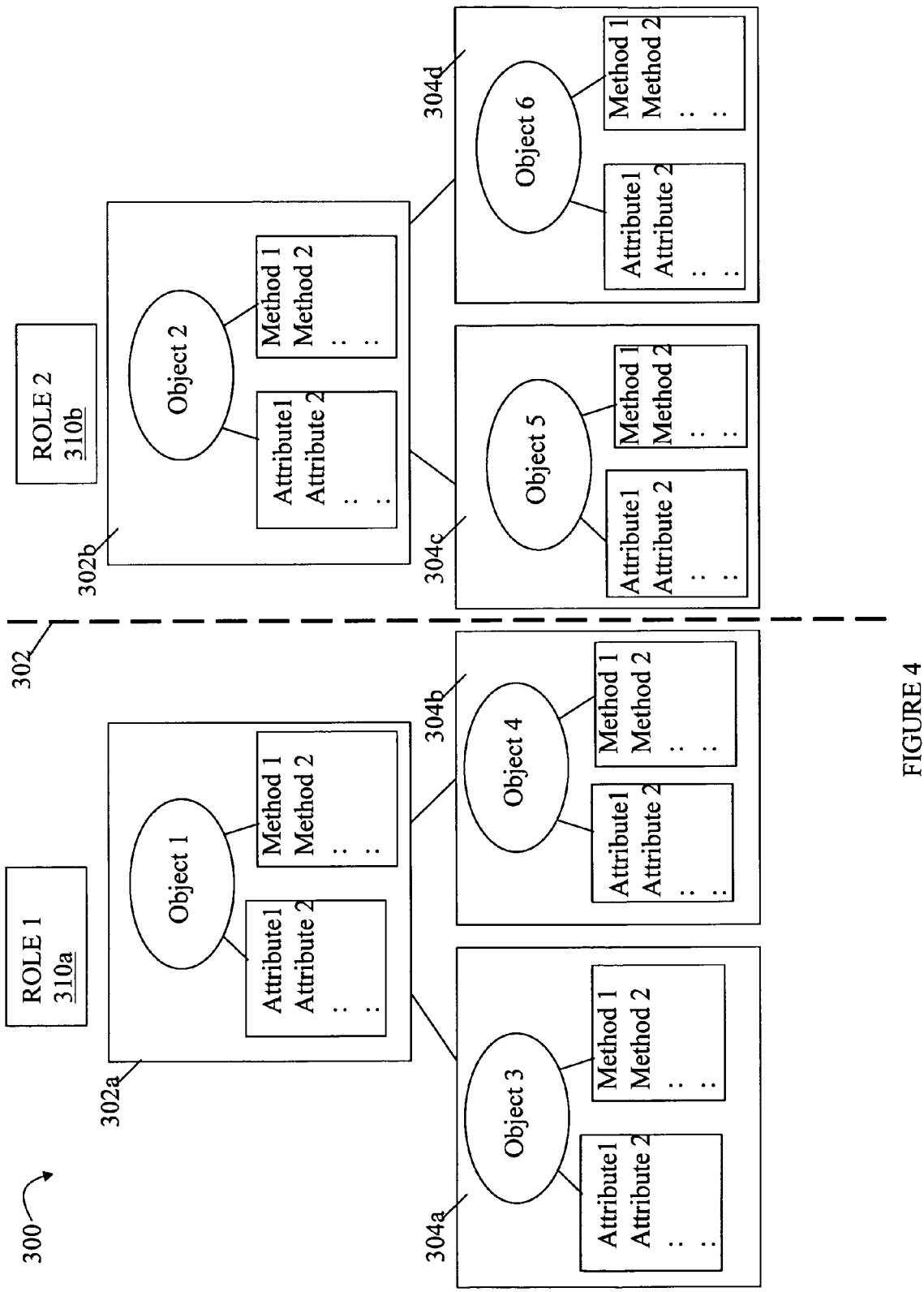

Referring to FIG. 4, shown is an example illustrating a third type of dimension of an object model which builds upon that as described above in connection with FIGS. 2 and 3. Shown in the example 300 are a plurality of objects 302, 302b, and 304a-304d. Elements 304a-304d may represent raw or basic objects. Elements 302a and 302b may represent composite objects. In the example 300, roles may be used to restrict access to a portion of the existing objects. Each of the defined roles may relate to one or more aspects such as related to one or more of a job function, title, particular technical area(s), particular application(s), and the like. For example, a first role of application 1 administrator may perform data storage administration tasks for a first application. A second role of application 2 administrator may similarly perform data storage administration tasks for a second application different from the first application. The tasks performed by any user having role 1 or role 2 may include performing data storage provisioning, backup and restoration operations, and the like. Each of the foregoing two defined roles each represented by one of 310a and 310b. A user assigned role 310a may have restricted access to a portion of existing objects such as to the left of the dashed line 302. A user assigned role 310b may have restricted access to a portion of existing objects such as to the right of the dashed line 302. Thus, roles may be used to control or restrict an assigned user's access to a subset of existing objects.

In a system having an object model based on only the dimensions of FIG. 4, access to composite objects, their associated raw objects, and any attribute and method thereof may be restricted based on roles. Thus, roles may be used to restrict or limit breadth with respect to all information associated with an object (e.g., allow/disallow access to an object and all its associated information (e.g., all associated objects, methods and attributes). However, roles may not allow access to only a portion of information associated with an object. In other words, a role may be used to allow/disallow access to an object and all its associated information but may not allow a sufficient granularity of control to allow/disallow access to only a portion of information associated with an object such as allow access to the composite object but not one or more associated raw objects, allow access to only some of the attributes and/or methods of the composite object or any of its associated raw objects, and the like.

Figure 5:
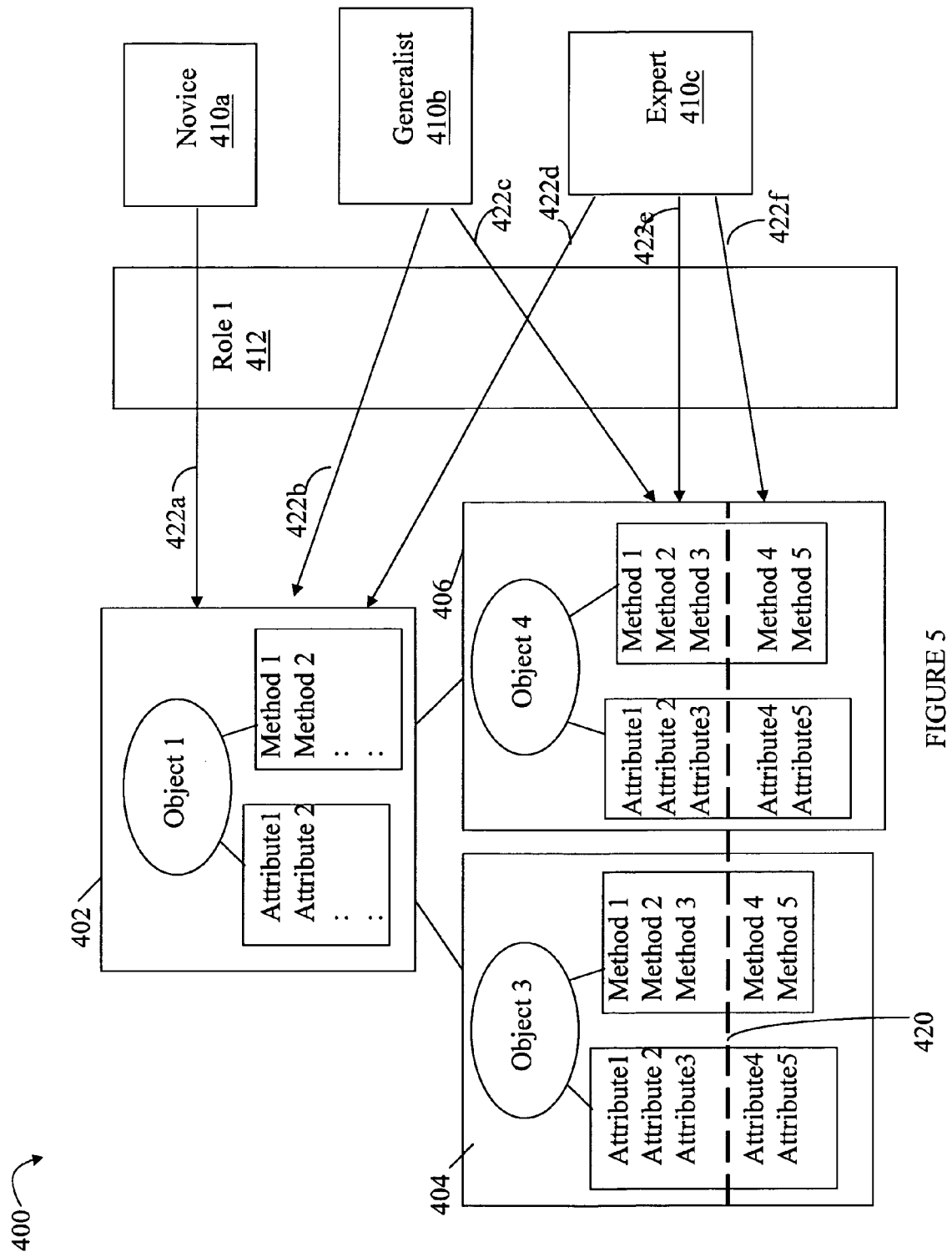

Referring to FIG. 5, shown is an example illustrating a fourth type of dimension of an object model which builds upon that as described above in connection with FIGS. 2, 3 and 4. Shown in the example 400 are a plurality of objects 402, 404 and 406. Elements 404 and 406 may represent raw or basic objects. Element 402 may represent a composite object. Element 412 may represent a single defined role, role 1. For each defined role, one or more levels of proficiency or skill may be also be specified. In the example 400, three skill levels are specified and denoted (in increasing order of skill or proficiency) as novice 410a, generalist or intermediate 410b and expert 410c. The fourth type of dimension allows for specifying different variations in skill level for a single role. Due to the varying levels of skill, each of 410a-410c for a single role may have varying levels of allowed access to objects and associated information.

The knowledge or skill levels 410a-410c may provide an additional level of filtering or access to composite objects, raw objects, and/or attributes and methods thereof. As described above, roles by themselves may not provide a sufficient granularity of control in that roles may not allow for specifying or restricting access to only some of the information associated with a particular object. Knowledge or skill levels in combination with roles may be used to limit access to only a portion of information associated with a single object, such as a composite object. In other words, roles and skill levels may be used to provide a sufficient granularity of control to allow/disallow access to only a portion of information associated with an object such as allow access to a composite object but not one or more associated raw objects, allow access to only some of the attributes and/or methods of the composite object or any of its associated raw objects, and the like. Thus, use of roles and skill levels may be used to provide a finer granularity of access control than roles alone with respect to both breadth and depth of existing objects. Depth may refer to limiting access with respect to information associated with a particular object (e.g. limiting access to an associated object such as a raw object associated with a composite object, or limiting access to attributes and methods of an object (e.g., composite or raw object) or one of its associated objects (e.g., raw object)).

As denoted by arrow 422a, a novice 410a may be allowed to only access composite object 402 and the attributes and methods of 402. However, the novice 410a may not be allowed to access associated raw objects 404 and 406, or any attribute or method thereof. As denoted by 422b and 422c, generalist 410b may be allowed to access composite object 402 (and attributes and methods of 402) and only a portion of the information for raw objects 404 and 406. As illustrated, the generalist 410b is allowed to access attributes and methods of 404 and 406 which are above the line 420. However, generalist 410b cannot access attributes 4, 5 and methods 4, 5 of objects 404 and 406. As denoted by 422d, 422e and 422f, expert 410c may be allowed to access all objects 402, 404 and 406 and any attribute and method thereof. Thus, a user assigned role 1 412 and expert level 410c is allowed unrestricted access to all objects, attributes and methods of the example 400.

To further illustrate, a first role (role 1 412) defined as general data storage administrator may perform data storage administration tasks for several different applications. The tasks may include performing data storage provisioning, backup and restoration operations, and the like for multiple applications. A user having the first role may be required to have access to object 402. However, the particular operations or tasks that may be performed by a data storage administrator assigned role 1 and having a beginner or novice level 410a of skill may be restricted in comparison to either of 410b and 410c denoting a higher level of skill and proficiency. A novice may be restricted for a variety of different reasons so that the novice user is not allowed to perform operations requiring greater skill and knowledge, is not able to display information and detail (e.g., particular attributes) about which he/she may know nothing, and the like. As skill level increases, the amount of information, types of allowed operations, level of detail, and the like, may also accordingly increase or vary.

It should be noted that different levels of proficiency or skill and roles are described, for example, in U.S. Pat. No. 7,523,231 which issued on Apr. 21, 2009, entitled Application Aware Storage, (the '231 patent), which is incorporated by reference herein, and U.S. patent application Ser. No. 11/906,131, filed Sep. 28, 2007, Gupta, et al., entitled Security and Licensing with Application Aware Storage, which is incorporated by reference herein.

Although three skill or proficiency levels are illustrated in the example of FIG. 5, an embodiment may provide for specifying any number of such levels for each role. It should be noted that use of terminology regarding a level of skill or proficiency may also be referred to herein as a level of knowledge and/or expertise.

Figure 6:
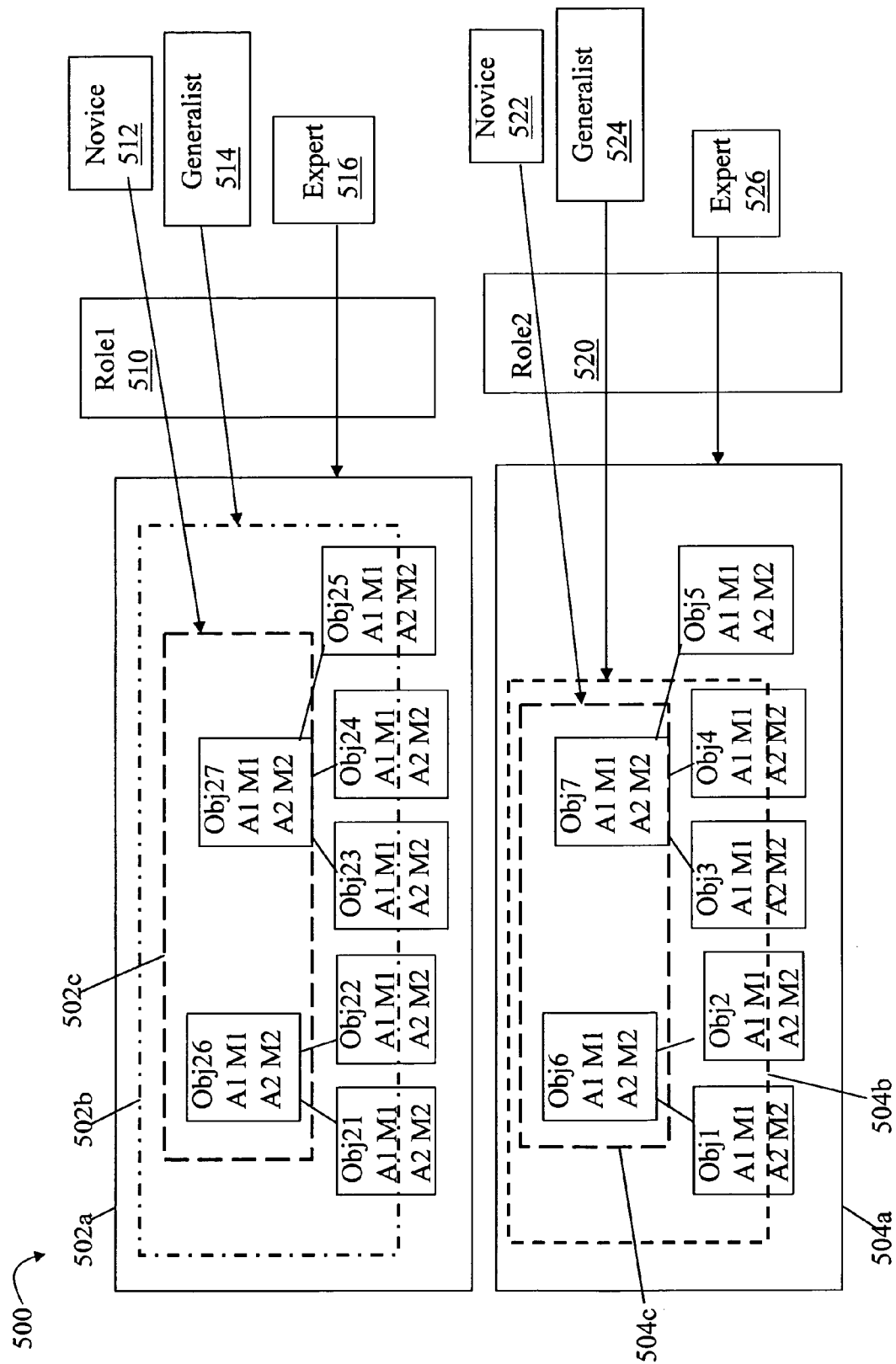

Referring to FIG. 6, shown is an example illustrating a fifth type of dimension of an object model which builds upon that as described above in connection with FIGS. 2, 3, 4 and 5. The example 500 illustrates an embodiment having multiple instances of roles and associated skill or proficiency levels for each such role. Furthermore, the example 500 identifies which objects and associated information are accessible for each skill level of a role. In accordance with techniques herein, an embodiment may define a template for each such role. The template may define the one or more associated skill levels applicable for use with the role. The template may also specify, for each of the skill levels of a role, which objects, related child objects, and object information (e.g., attributes and/or methods of the object, attributed and/or methods of a related object) are accessible. An embodiment may include, or otherwise provide for creating, a plurality of such templates, where each such template is defined for a particular role. The template for a role may then be used in connection with specifying which objects are accessible to a user, where the user has an account, user identifier, and the like, which is assigned the particular role and one of the skill levels for the role.

In the example 500, an object (obj) and its identifier (N, N being an integer) are denoted as "objN" (e.g., obj26), each attribute (A) and its associated identifier (n, n being an integer) are denoted as "An" (e.g., A1), and each method (M) and its associated identifier (n, n being an integer) are denoted as "Mn" (e.g., M1).

With reference to FIG. 6, the example 500 includes role 1 510 and associated skill levels (512, 514 and 516), and role 2 520 and associated skill levels (522, 524 and 526). A first template may be defined for role 1 510 identifying the skill levels 512, 514 and 516 and specifying the objects and object information accessible for each such skill level. For a user assigned role 1 510, novice level 512, the user can access the objects and object information included in dashed box 502c (e.g., objects 26 and 27 (obj26 and obj27) and the attributes and methods of objects 26 and 27). For a user assigned role 1 510, generalist level 514, the user can access the objects and object information included in dashed box 502b (e.g., objects 26 and 27, all attributes and methods of objects 26 and 27, and attribute 1 (A1) and method1 (M1) of objects 21, 22, 23, 24 and 25). However, generalist 514 cannot access attribute 2 (A2) and method2 (M2) of objects 21, 22, 23, 24 and 25. For a user assigned role 1 510, expert level 516, the user can access all objects and object information included in box 502a (e.g., objects 21-27 and all attributes and methods thereof).

A second template may be defined for role 2 520 identifying the skill levels 522, 524 and 526 and specifying the objects and object information accessible for each such skill level. For a user assigned role 2 520, novice level 522, the user can access the objects and object information included in dashed box 504c (e.g., objects 6 and 7 and the attributes and methods of objects 6 and 7). For a user assigned role 2 520, generalist level 524, the user can access the objects and object information included in dashed box 504b (e.g., objects 6 and 7, all attributes and methods of objects 6 and 7, and attribute 1 (A1) and method1 (M1) of objects 1-4). However, generalist 524 cannot access attribute 2 (A2) and method2 (M2) of objects 1-4 and cannot access anything regarding object 5. For a user assigned role 2 520, expert level 526, the user can access all objects and object information included in box 504a (e.g., objects 1-7 and all attributes and methods thereof).

As a variation to the foregoing, a single template may be defined for each possible combination of role and level of expertise. With reference to FIG. 6 with this variation, 3 templates may be defined for role 1 510 and 3 template may be defined for role 2 520. This variation may be a matter of how templates are implemented in an embodiment for each role. Thus, although examples provided herein for illustration may refer to a single template for a role, it should be noted that an embodiment may implement the techniques herein with a different template for each combination of role and level of expertise.

In connection with techniques herein, templates may be used to provide a multi-dimensional data model. The templates may be used to provide an object model and implement a flexible data management framework for restricting or filtering access to selected objects (e.g., composite, and related objects) and/or selected portions of object information (e.g., object attributes and methods) for a user assigned a role and an associated level of expertise. As also described in following paragraphs, an embodiment may also use other criteria in addition to the role and level of expertise in defining a template and filtering access to selected objects and/or object information. As set forth in more detail below, such other filtering criteria may relate to, for example, particular application(s) identified and other indicator(s) used to infer a level of expertise. The other indicators may relate to the complexity of the data storage system and/or data storage environment as well as the identified applications.

Figure 7:
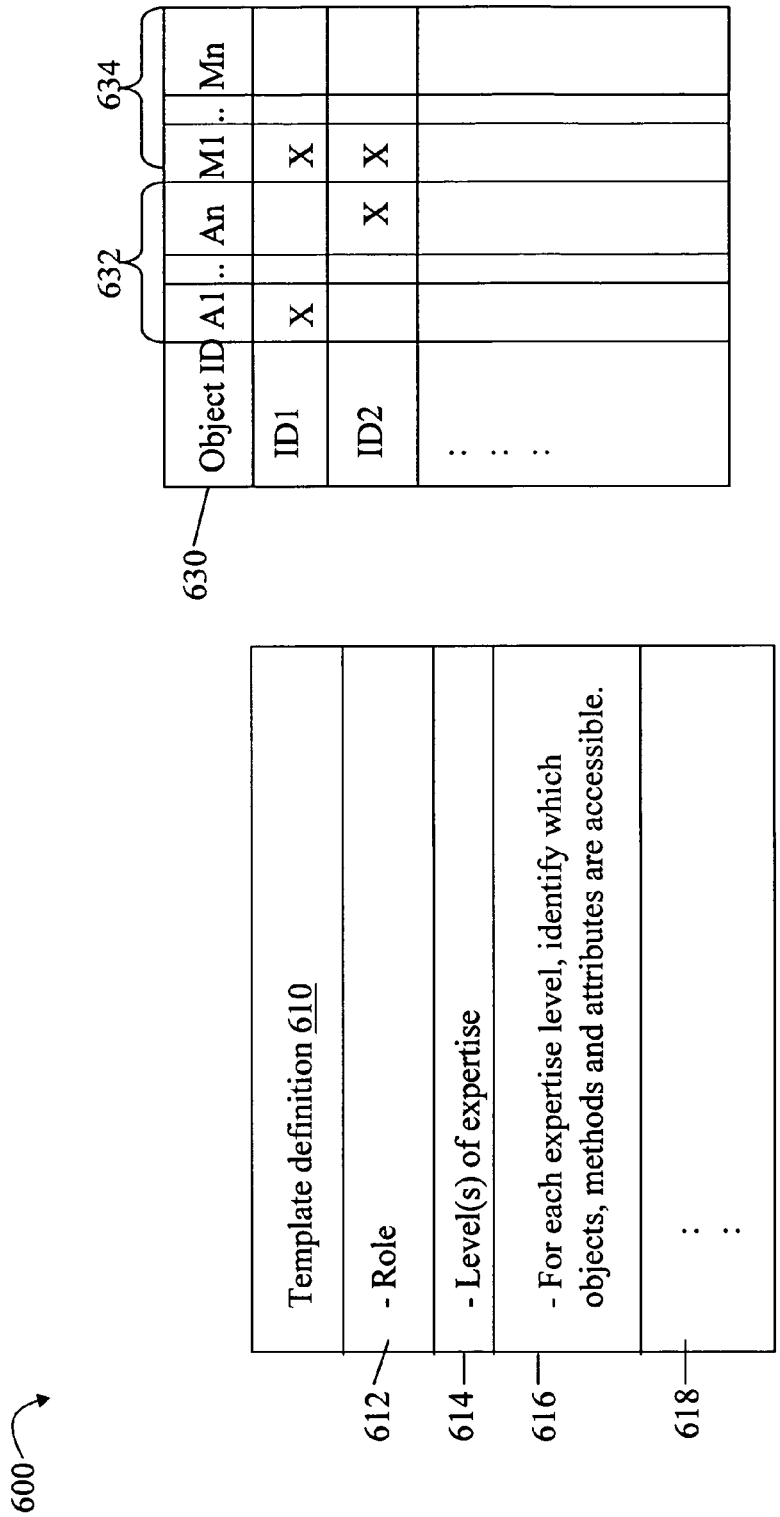
FIG. 7 is an example illustrating a template definition in an embodiment in accordance with techniques herein.

Referring to FIG. 7, shown is an example of information that may be used in connection with creating a template definition in an embodiment in accordance with techniques herein. The example 600 includes a template definition 610 including a role 612, one or more of levels of expertise 614, and accessible objects 616 for each expertise level of 614. The template definition 610 may also include other information 618. In this example 600, an embodiment may create a single instance of 610 for each role. Element 612 represents the name of the role, such as "Email application 1 administrator" for performing data storage administration tasks for a particular email application such as Microsoft Exchange, database administrator for performing data storage administration for one or more database applications, and the like. Element 614 may represent the one or more levels of expertise for the role identified in 612. Element 614 may identify three levels such as novice, generalist and expert illustrated in FIG. 5.

Element 616 may identify, for each expertise level of 614, which objects (including composite and raw objects), and object information (e.g., attributes, methods, and the like) for each object are accessible. A type of allowed access or operation (e.g., read, write, delete, create, etc) that may be performed on an object or attribute may be specified by having 616 indicate access to invoke a particular method. An embodiment may represent the information of 616 for each expertise level of 614 in a variety of different ways. Element 630 is one example of how an embodiment may specify what objects, attributes, methods, and the like, are accessible for an expertise level 614. An instance of 630 may be specified for each expertise level denoted in 614. Element 630 is a table listing each object and the attributes 632 and methods 634 defined for each object. Each object may be represented by a unique object identifier, denoted as object ID in the first column of 630. In one embodiment, the object ID as used in the first column of 630 may be a class name, such as a class name of a class used with a programming language such as C, C++, Java, and the like. A user creating a template may be presented with a table 630 of existing objects and may select which objects, methods and attributes are accessible for a particular role and expertise level. For example, with reference back to FIG. 6 for role 1 510, an instance of table 630 may be specified for each of the levels 512, 514 and 516. The table 630 for role 1 510, novice 512 may indicate access to objects 26 and 27 and all methods and attributes thereof. Access for a particular attribute or method of an object may be denoted with an X in the appropriate table entries.

Other embodiments may provide different ways in which permissible access to objects, methods, attributes, and the like, may be specified. For example, specifying access to a particular object which is a composite object may, by default, also provide access to all related objects, and the attributes and methods of the composite object and all the related objects. When creating a template, a user may be asked for additional information such as to identify the particular application(s) for which the role is performing administration. At the time of template creation, a system may have defined object groupings and/or object information where a particular object grouping and/or object information is associated with an application. As such, a user creating a template may indicate that the role 612 performs management for applications 1 and 2. A first group of existing objects may be defined for application 1 and a second group of existing objects may be defined for application 2. The user may be presented with a table 630 populated with information for the first and second groups of objects appropriate for applications 1 and 2. The user may select which objects, attributes, and methods of the first and second groups are accessible for each combination of role and level of expertise. In this way, the table 630 may be selectively populated initially with a first set of objects and object information. In an embodiment, the user may be allowed to further modify the table, such as by adding one or more objects, object groupings, and the like.

When creating the template, the user may be asked for additional information such as related to the complexity of the data storage system and/or data storage environment. For example, the user may asked to enter information regarding a number of data storage systems being managed, which application(s) have data host on the data storage systems, and the like as described in more detail elsewhere herein. This information may be used to assess a level of expertise rather than have a user directly select a level. In other words, code may be executed to obtain the additional information (either from the user via user data entry and/or through configuration files describing the data storage system and/or environment) characterizing aspects related to the complexity of the data storage system and/or data storage environment. The code may automate selection of a level of expertise based on this additional information.

An embodiment may also store the additional information obtained such as related to the particular applications, the complexity of a particular application, the complexity of the data storage system and/or data storage environment, and the like, as part of the template definition in 618. As described in more detail below, this additional information, along with the role, and/or possibly other keywords associated with the template, may be used as matching criteria when later searching for a matching existing template for association with a user identifier or user account.

The additional information as well as information of fields 612 and 614 that may be obtained as part of template creation may also be used to further identifying objects and/or object information that may included by default in the table 630. For example, as described above, a level of expertise may be specified either through direct user selection or indirectly through automated means of code execution. An embodiment may have sets of predefined groupings of objects and/or object information for particiular applications. Furthermore, a variation of such sets of predefined groupings may exist for different levels of expertise. To illustrate, a first set of objects and/or object information may be defined for a particular application. Once a level of expertise is determined, this first set may be further varied depending on the level. The first set may be defined and, depending on the level of expertise, different child objects and/or object information may be exposed to the user. Higher levels of expertise are provided with greater in-depth exposure (e.g., the higher the level of expertise, the greater the in-depth exposure to child objects and/or object information). The foregoing first set or variation thereof for level of expertise may be used to populate table 630 when identifying which objects and object information are accessible.

Figure 8:
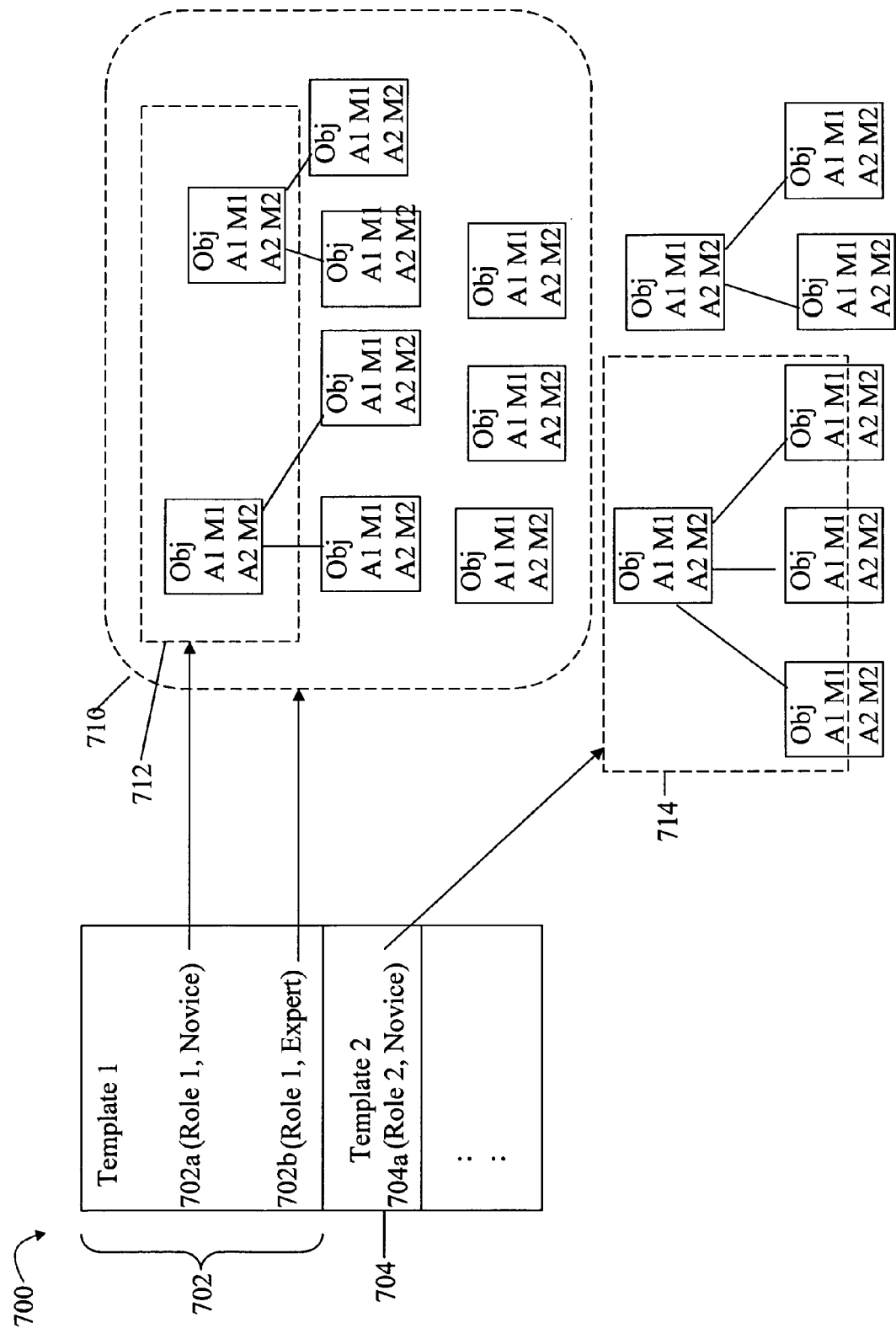
FIG. 8 is an example illustrating use of templates as filters to restrict access to objects and object information in an embodiment in accordance with techniques herein.

Referring to FIG. 8, shown is an example further representing how a template may be used to provide access to a portion of existing objects and object information in an embodiment in accordance with techniques herein. The example 700 provides an illustration of using a template as described above to provide or filter access to a portion of existing objects and object information. The object access model is specified using one or more defined templates where each template identifies or specifies allowable access to a subset of existing objects and object information for each combination of role and level of expertise. In connection with example 700, there may be two templates defined—template 1 702 and template 2 704. Template 1 702 may be defined for role 1 having two expertise levels: novice and expert. Element 702a may represent the table or other information of template 1 specifying the objects and object information of 712 accessible for role 1, novice. Element 702b may represent the table or other information of template 1 specifying the objects and object information of 710 accessible for role 1, expert. Template 2 704 may be defined for role 2 having one expertise level of novice. Element 704a may represent the table or other information of template 2 specifying the objects and object information of 714 accessible for role 2, novice.

It should be noted that although FIG. 8 and other herein illustrate each role has having access to objects which are not accessible using any other role, this may vary with an embodiment and should be construed as a limitation of techniques herein. For example, a set of objects and/or object information may be accessible using different multiple roles using different templates.

Figure 9:
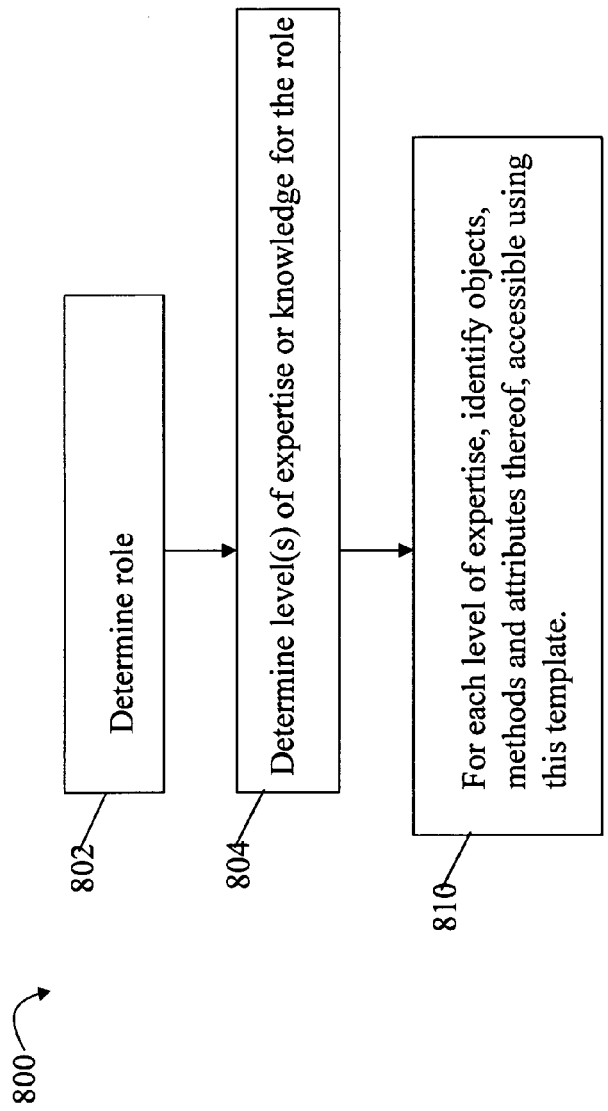
FIGS. 9 and 10 are flowcharts of processing steps that may be performed in an embodiment in accordance with techniques herein.

Referring to FIG. 9, shown is a flowchart of processing steps that may be performed in an embodiment in creating a template in accordance with techniques herein. The flowchart 800 summarizes processing described above for creating or building a single template for a role. At step 802, the role is determined. Step 802 may include specifying a name or other description for the role whose template is being created. At step 804, one or more levels of expertise or knowledge are specified for the role. As described above, examples of such levels may include novice, generalist or intermediate, and expert or advanced. At step 810, objects and object information are identified for each expertise level of 804. Such information identified for an expertise level may be stored, for example, in a table such as 630 of FIG. 7 indicating which objects and object information are accessible for the combination of role and level of expertise. Once step 810 has been performed for each level of 804, the template may be saved and stored, for example, in a template database or any other type of data container.

The processing of flowchart 800 may be implemented using a computer-driven user-dialogue (e.g., with data input and output) such as with a script, graphical user interface displays of a wizard, and the like.

Once a template has been created, the template and one of the levels of expertise may be associated with a user identifier. The user identifier may be presented as part of the credentials or authentication information when using a data storage system for performing different tasks, such as data administration tasks. When a user logs in or otherwise performs processing on the data storage system using the user identifier, the associated template may be used to restrict access for that particular user identifier to the objects and object information specified in the associated template. In connection with selecting a particular template, such as in connection with creating a new user account and associated user identifier or modifying an existing user account having an associated user identifier, information regarding existing templates and associated levels of expertise may be presented to a user as part of a dialogue. From the presented information, a template and associated level of expertise may be made selected for the particular user identifier and account. It should be noted that more than one role and associated level of expertise may be selected and associated with a particular user identifier. For example, a particular user may perform operations associated with multiple different roles.

An embodiment may include a dialogue for template selection where the user selects a template and level of expertise. Additionally, in an effort to further assist in template usage and selection, the dialogue may provide a recommendation or a determination regarding level of expertise based on one or more other inputs. For example, a user performing account management may not know whether to select novice, intermediate or expert level. As such, the user performing account management may be prompted for other information used as criteria for recommending or having the dialogue automatically select one of the levels for a template. For example, the user may be prompted to enter other information or make selections indicating a level of complexity of the data storage system and/or applications being managed. An embodiment may also be able to automatically determine such information about a particular system such as from a configuration file. Variations in complexity as related to a particular data storage system arrangement and environment, applications for which a particular role or user perform data storage system management, and the like, may provide an indication regarding the level of knowledge or expertise of the user. For example, the additional information provided (either through user input and/or in an automated fashion without user input/selection) may identify a class, type, or commercial name of data storage system that may vary with complexity, whether the system managed includes multiple data storage systems (e.g., such as data storage arrays) networked together, whether the system has a large number and/or different types of storage devices, and the like. In order to perform management for particular classes of data storage systems, applications, and the like, a particular knowledge level may be presumed. For example, a data storage system and/or data storage system environment may be classified as having a relatively high level of complexity. For a role, three levels of expertise as illustrated in FIG. 6 may be specified. A user performing data storage system management for a system and/or environment categorized as having the high level of complexity may be presumed to have a minimum knowledge level of "generalist". As such, executing code may process the additional information related to complexity of the system and select generalist as a level of expertise for use in connection with account creation.

Figure 10:
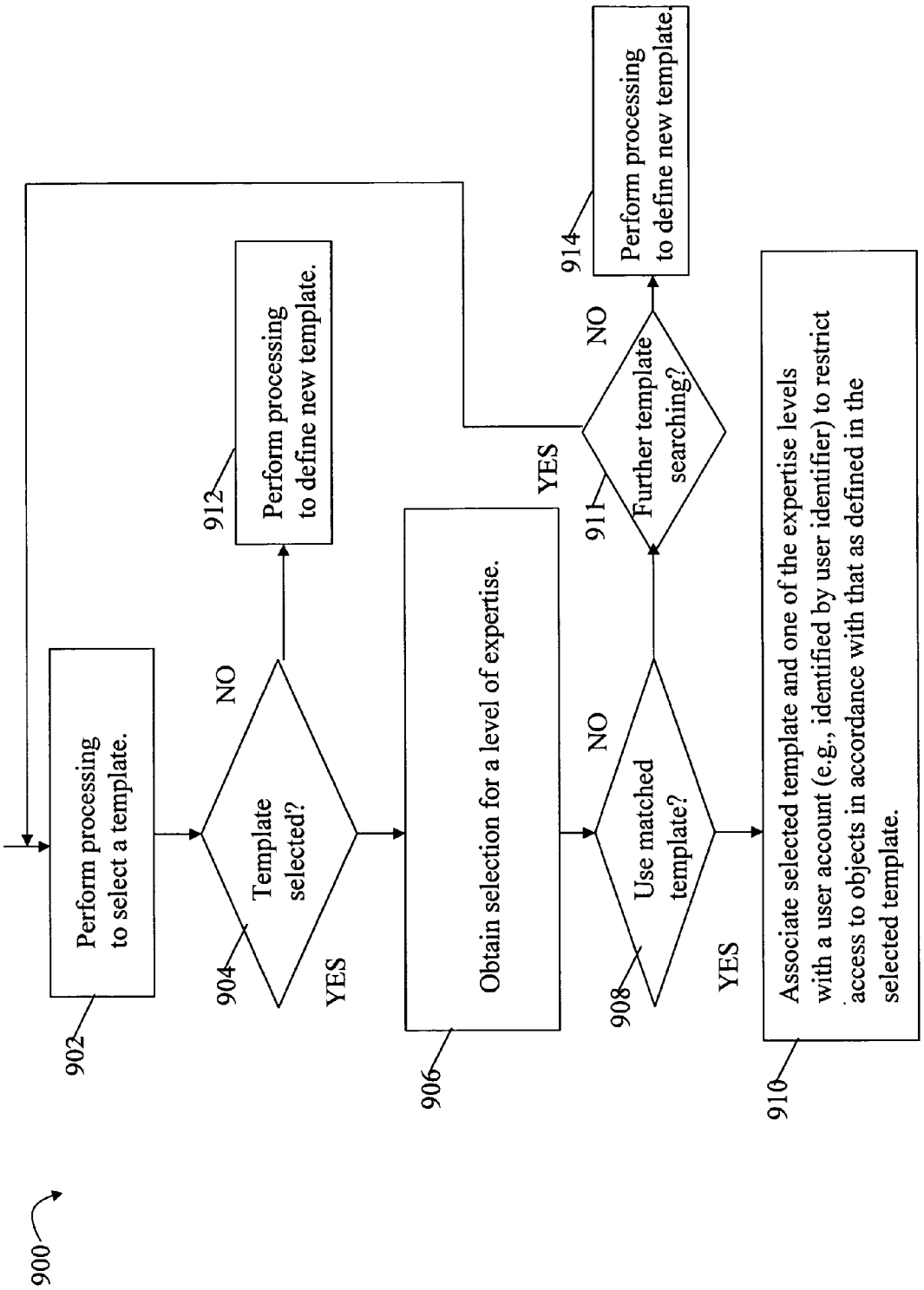

Referring to FIG. 10, shown is a flowchart of processing steps that may be performed in an embodiment in accordance with techniques herein using templates. The steps of 900 summarize processing described above in connection with selection and use of a template for a user account having an associated user identifier. Flowchart 900 assumes that one or more templates have already been created. At step 902, processing may be performed to select a single template. Step 902 may include a user manually selecting one of the existing templates after displaying a list of templates and/or information about such templates to the user. It should also be noted that an embodiment may perform additional processing to assist in selection of a single template. For example, as a variation to that described above, template creation may include specifying template matching criteria. Such criteria may include the role, one or more other keywords which are associated with the template, particular application(s), information regarding the complexity of the data storage system and/or data storage environment, and the like. Step 902 may include querying a database or other data container of the existing templates rather than previewing a list of all existing templates. The user may enter one or more query terms. A search is performed using the query terms with respect to matching criteria (e.g., keywords, roles, and other information such as may be included in 618 of the template definition described above in connection with FIG. 7) associated with existing templates to determine if there are any matches between the query terms and the matching criteria for existing templates. Those one or more templates having matching criteria which match the query terms may be displayed and a user may select a template from the displayed list.

At step 904, a determination is made as to whether a template selection has been made. In one embodiment after performing step 902, a user may either select an existing template or otherwise select an option to create a new template, for example, if a desired template does not already exist (as determined by step 902 processing). If step 904 evaluates to no, control proceeds to step 912 where processing may be performed to create a new template. Step 912 may include performing processing as described above, for example, in connection with FIGS. 7 and 9. If step 904 evaluates to yes and a template has been selected, control proceeds to step 906. At step 906, once a user has selected a template, a selection for one of the levels of expertise in the template is made. A user may then be prompted at step 908 to confirm whether to proceed with the current selections for the template and level of expertise. If step 908 evaluates to no, control proceeds to step 911 where a determination is made as to whether the user wants to perform further template searching. If so, control proceeds to step 902. Otherwise, if step 911 evaluates to no, processing may continue with step 914 to define a new template. Step 914 processing is similar to step 912. If step 908 evaluates to yes, control proceeds to step 910 to associate the selected template and level of expertise with a selected user account and/or identifier. Subsequent to step 908, when a user performs processing, such as for data storage administration tasks, using the user account and/or identifier, the user has restricted access to objects in accordance with those specified in the selected template.

The template and level of expertise selection for a particular user (e.g., as may be identified with a user account and/or user identifier) may also be used in connection with performing filtering for a user interface. For example, the level of expertise may be used in connection with determining a level used for the UI as described in the '231 patent for Application Aware Storage mentioned above. The level of expertise and/or objects which are accessible per the selected template may be used in determining what operations can be performed, what information (e.g., attributes) can be displayed, and the like. Thus, the information and menu selections presented to a user may vary with template or role and level of expertise selected.

As noted above, an embodiment in accordance with techniques herein may create a single template for each combination of role and associated level of expertise so that a single template may specify accessible objects and object information for the combination.

Subsequent to initially specifying which objects and object information are accessible for a particular combination of role and associated level of expertise, the objects and/or object information may be updated. An embodiment may define different policies in connection with whether new objects and/or new object information is automatically accessible for particular templates, roles and/or levels of expertise, and the like.

Although the techniques herein are described with reference to a data model related to objects, the techniques herein using templates may also be applicable for use with other types of data models.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method for controlling access to objects comprising:
   providing a plurality of templates, said plurality of templates including information specifying a plurality of roles, a plurality of levels of expertise for each of the plurality of roles whereby each of the plurality of levels of expertise for said each role identifies a different level of expertise for said each role, and which objects and object information are accessible to each of said plurality of levels of expertise for each of said roles;
   selecting a first of the plurality of templates for a first of the plurality of roles, said first template including information specifying said first role, a plurality of levels of expertise each identifying a different level of expertise for said first role, and which objects and object information are accessible to each of said plurality of levels of expertise of said first role;
   selecting a first of said plurality of levels of expertise for said first role;
   associating the first template and said first level of expertise with a user identifier;
   restricting access to objects and object information in accordance with the first template when performing processing for the user identifier, wherein said first template includes other information identifying an application, a level of complexity of a data storage system, a level of complexity of a data storage system environment, and keywords used as matching criteria when selecting the first template;
   querying a database of existing templates rather than previewing a list of all existing templates, said querying using query terms with respect to matching criteria associated with existing templates;
   determining if there are any matches between the query terms and the matching criteria for existing templates;
   displaying a list of templates having matching criteria which match the query terms;

selecting a template from the displayed list; and
creating a new template if a desired template does not already exist.

2. The method of claim 1, wherein said object information includes attributes and methods for one or more objects.

3. The method of claim 2, wherein each of said plurality of templates is associated with a different one of the plurality of roles and specified one or more levels of expertise associated with the different one of the plurality of roles associated with said each template.

4. The method of claim 1, wherein each of said plurality of levels of expertise associated with each of the plurality of roles indicates a different level of knowledge.

5. The method of claim 1, wherein said plurality of levels of expertise for said first role includes said first level indicating a first user knowledge level and a second level indicating a second user knowledge level greater than said first level.

6. The method of claim 5, wherein, when said user identifier is associated with said first level of expertise for said first role, a user using said user identifier has access to a first set of objects and object information, and when said user identifier is associated with said second level of expertise for said first role, a user using said user identifier has access to a second set of objects and object information.

7. The method of claim 6, wherein said second set includes said first set of objects and object information and additional object information.

8. The method of claim 7, wherein at least one object in one of the first set or the second set is a composite object associated with another object which is a child object of the composite object.

9. The method of claim 8, wherein the composite object is included in the first set and the second set, and the child object is included in the first set and not included in the second set.

10. The method of claim 8, wherein the composite object is included in the first set and the second set, and at least one attribute or method of the composite object is included in the first set and not included in the second set.

11. The method of claim 8, wherein the composite object and the child object are included in the first set and the second set, and at least one attribute or method of the child object is included in the first set and not included in the second set.

12. The method of claim 1, wherein said plurality of levels of expertise of each of the plurality of roles includes a novice level, a generalist or intermediate level, and an expert level.

13. The method of claim 1, wherein said first role describes a data storage administrator role for performing data storage administration.

14. The method of claim 13, wherein the first role is for performing data storage administration for one or more of an email application and a database application.

15. The method of claim 1, further comprising:
creating said plurality of templates including said first template;
and
selecting said first level of expertise for said first role using additional information indicating a level of complexity of a data storage system and/or data storage system environment.

16. The method of claim 15, wherein as part of creating the template, the method further includes:
populating a table with a predetermined set of objects and/or object information selected in accordance with the first role of the template, the plurality of levels of expertise of the template for the first role, one or more applications identified as associated with the template, a level of complexity associated with one or more applications, and information regarding a level of complexity of the data storage system and/or data storage environment associated with the template.

17. The method of claim 1, wherein said first template identifies allowable operations that can be performed for data storage administration, a first of said objects representing an application for which data storage administration is performed, a second of said objects associated with the first object representing a data storage area used by said application for storing data, said second object having at least a first method thereof identifying an administrative task perform for the data storage area represented by the second object, said first template indicating that the user identifier has access to the first method and is allowed to perform the administrative task for the data storage area.

18. A computer-implemented method for controlling access to data comprising:
providing a plurality of templates, said plurality of templates including information specifying a plurality of roles, a plurality of levels of expertise for each of the plurality of roles whereby each of the plurality of levels of expertise for said each role identifies a different level of expertise for said each role, and which objects and object information are accessible to each of said plurality of levels of expertise for each of said roles;
selecting a first of the plurality of templates for a first of the plurality of roles, said first template including information specifying said first role, a plurality of levels of expertise each identifying a different level of expertise for said first role, and which objects and object information are accessible to each of said plurality of levels of expertise of said first role;
selecting a first of said plurality of levels of expertise for said first role;
associating the first template and said first level of expertise with a user identifier;
restricting access to objects and object information in accordance with the first template when performing processing for the user identifier, wherein said first template includes other information identifying an application, a level of complexity of a data storage system, a level of complexity of a data storage system environment, and keywords used as matching criteria when selecting the first template;
querying a database of existing templates rather than previewing a list of all existing templates, said querying using query terms with respect to matching criteria associated with existing templates;
determining if there are any matches between the query terms and the matching criteria for existing templates;
displaying a list of templates having matching criteria which match the query terms;
selecting a template from the displayed list; and
creating a new template if a desired template does not already exist.

19. A non-transitory computer readable medium comprising executable code stored thereon to control access to objects, the non-transitory computer readable medium comprising executable code that:
providing a plurality of templates, said plurality of templates including information specifying a plurality of roles, a plurality of levels of expertise for each of the plurality of roles whereby each of the plurality of levels of expertise for said each role identifies a different level of expertise for said each role, and which objects and object information are accessible to each of said plurality of levels of expertise for each of said roles;

selecting a first of the plurality of templates for a first of the plurality of roles, said first template including information specifying said first role, a plurality of levels of expertise each identifying a different level of expertise for said first role, and which objects and object information are accessible to each of said plurality of levels of expertise of said first role;

selecting a first of said plurality of levels of expertise for said first role;

associating the first template and said first level of expertise with a user identifier;

restricting access to objects and object information in accordance with the first template when performing processing for the user identifier, wherein said first template includes other information identifying an application, a level of complexity of a data storage system, a level of complexity of a data storage system environment, and keywords used as matching criteria when selecting the first template;

querying a database of existing templates rather than previewing a list of all existing templates, said querying using query terms with respect to matching criteria associated with existing templates;

determining if there are any matches between the query terms and the matching criteria for existing templates;

displaying a list of templates having matching criteria which match the query terms;

selecting a template from the displayed list; and creating a new template if a desired template does not already exist.

* * * * *